(12) United States Patent
Rastegar

(10) Patent No.: US 8,912,710 B2
(45) Date of Patent: Dec. 16, 2014

(54) ENERGY HARVESTING FROM INPUT IMPULSE WITH MOTION DOUBLING MECHANISM FOR GENERATING POWER FROM MORTAR TUBE FIRING IMPULSES AND OTHER INPUTS

(75) Inventor: Jahangir S. Rastegar, Stony Brook, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 416 days.

(21) Appl. No.: 13/372,487

(22) Filed: Feb. 13, 2012

(65) Prior Publication Data

US 2013/0049538 A1 Feb. 28, 2013

Related U.S. Application Data

(60) Provisional application No. 61/444,746, filed on Feb. 20, 2011.

(51) Int. Cl.
*H02N 2/18* (2006.01)
(52) U.S. Cl.
CPC .................................... *H02N 2/186* (2013.01)
USPC ......................................................... 310/339
(58) Field of Classification Search
CPC ................................ H02N 2/18; H02N 2/186

USPC ........................................................... 310/339
See application file for complete search history.

(56) References Cited

U.S. PATENT DOCUMENTS

| | | | | |
|---|---|---|---|---|
| 7,439,657 B2* | 10/2008 | Clingman et al. | ............ | 310/339 |
| 7,821,183 B2* | 10/2010 | Rastegar | ........................ | 310/339 |
| 8,030,786 B2* | 10/2011 | Jackson et al. | ................ | 290/1 R |
| 8,266,963 B2* | 9/2012 | Rastegar et al. | ........... | 73/514.34 |
| 8,410,667 B2* | 4/2013 | Rastegar et al. | .............. | 310/339 |
| 8,541,927 B2* | 9/2013 | Hayamizu | ..................... | 310/339 |
| 8,646,334 B2* | 2/2014 | Rastegar | ................... | 73/514.38 |
| 8,680,750 B2* | 3/2014 | Kang et al. | .................... | 310/339 |
| 8,736,148 B2* | 5/2014 | Penn | ............................. | 310/339 |
| 2007/0263887 A1* | 11/2007 | Tanner | ......................... | 381/190 |
| 2007/0278902 A1* | 12/2007 | Rastegar et al. | .............. | 310/339 |
| 2008/0174620 A1* | 7/2008 | Tanner | ............................ | 347/10 |
| 2010/0258020 A1* | 10/2010 | Rastegar et al. | .............. | 102/209 |
| 2010/0283264 A1* | 11/2010 | Rastegar et al. | .............. | 290/1 R |

* cited by examiner

*Primary Examiner* — J. San Martin

(57) ABSTRACT

A method for harvesting energy from an input deflection. The method including: storing mechanical potential energy in at least one spring element resulting from an acceleration of a mass connected to the at least one spring element; transferring the stored potential energy to a flexible element to deflect the flexible element; and converting the deflection of the flexible element to electrical energy by compressing at least one piezoelectric element due to the deflection.

20 Claims, 7 Drawing Sheets

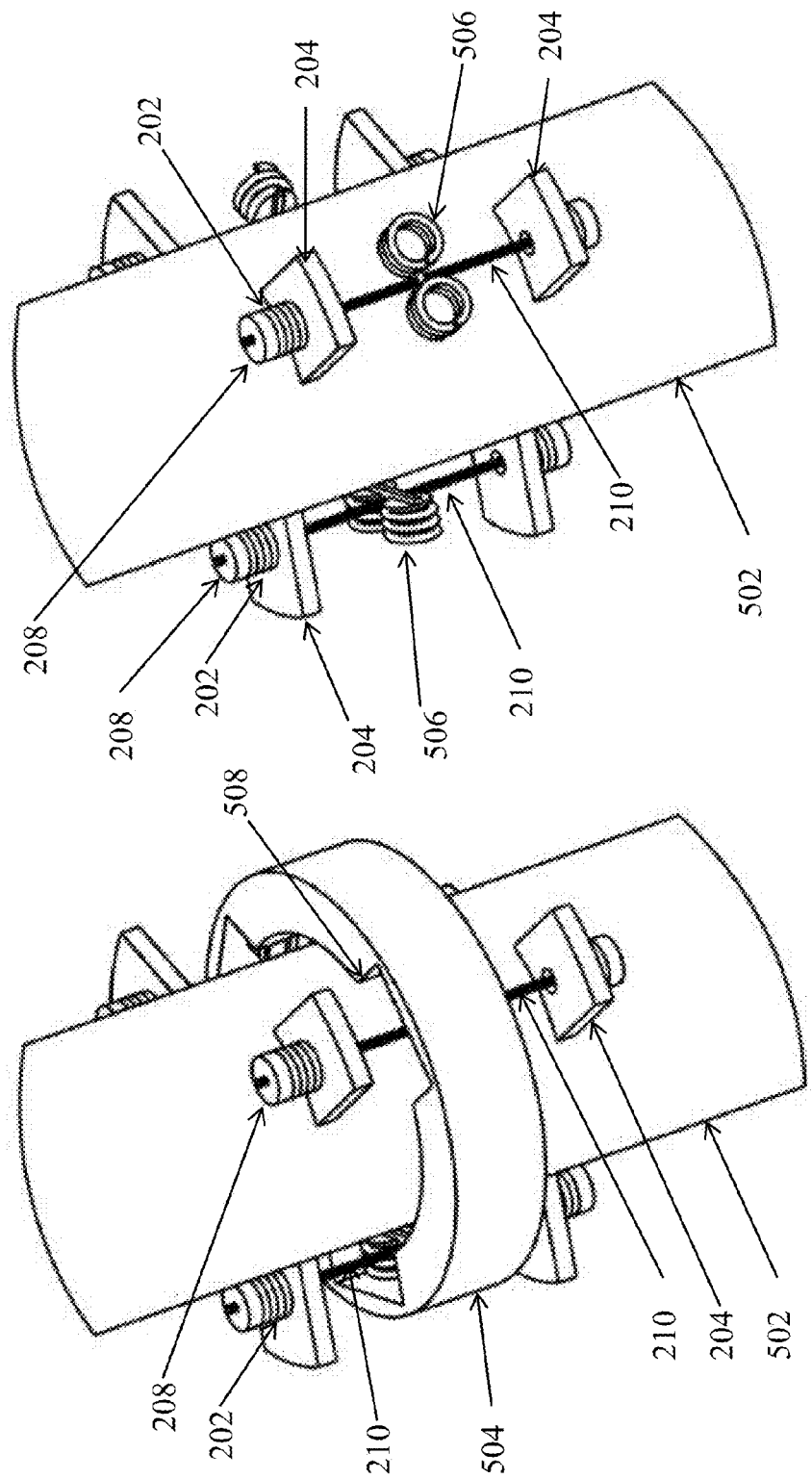

ENERGY HARVESTING FROM INPUT IMPULSE WITH MOTION DOUBLING MECHANISM FOR GENERATING POWER FROM MORTAR TUBE FIRING IMPULSES AND OTHER INPUTS

CROSS-REFERENCE TO RELATED APPLICATIONS

This application claims benefit to U.S. Provisional Application No. 61/444,746 filed on Feb. 20, 2011, the contents of which are incorporated herein by reference.

BACKGROUND

1. Field

The present application relates generally to energy harvesting devices, and more particularly, to energy-harvesting from input impulse with motion doubling mechanism for generating power from mortar tube firing impulses and the like.

2. Prior Art

Providing a safe, lightweight, and reliable source of electrical power for ancillary electronic systems for infantry weapon platforms is an ongoing supply chain problem, especially when operating in remote areas. Given recent advances in low-power electronics for components such as fire control systems, energy harvesting technology is seeing renewed attention as a replacement or supplement for power sources such as batteries in many systems.

Harvesting energy from the environment to power various devices is not new. The earliest such devices can probably be said to be windmills. The first windmills were developed to mechanize the tasks of grain-grinding and water-pumping. The earliest-known design is the vertical axis system developed in Persia circa 500-900 CE. The first documented design is also of Persian origin, this one with vertical sails made of bundles of reeds or wood which were attached to the central vertical shaft by horizontal struts.

In recent years, particularly following the development of low-power electronics, sensors and wireless communications devices, electrical energy generators that harvest energy from the environment have seen renewed attention. In this area, piezoelectric materials have been widely used to generate electrical energy from ambient vibration. Such electrical energy generators and methods of collecting, regulating and storing the generated electrical energy have been the subject of numerous studies.

Harvesting energy from transient high-shock events such as gun-firing and converting it to usable electrical energy is also not new. The developed piezoelectric power generators are generally suitable for applications with low to medium power requirements. To date, several such piezoelectric-based power generators have been developed and tested for fuzing applications, which are designed to produce up to 2 Joules of energy from firing accelerations of 20,000 G's-40,000 G's.

SUMMARY

The energy harvesting devices and methods disclosed herein harvest mechanical energy from a recoil perturbation of a weapon platform and convert that energy to electrical power using piezoelectric elements. First disclosed are devices and methods that increase the performance and efficiency of devices which harvest energy from high-shock transient impulses such as gun-firing. Next disclosed is the application of such technology as a power source for the fire control system for a mortar, such as a 60 mm mortar. Still further disclosed are general concepts of energy harvesting from the high-shock environment augmented with considerations of the nature of the recoil perturbation of a particular weapon platform, as well as mathematical simulation results of performance and efficiency.

It should be noted that the disclosed generators are not limited to harvesting energy from a weapon recoil perturbation, but that the devices may be parameterized to harvest energy from almost any environment which is characterized by transient or steady-state shock or vibration/oscillation on a wide range of machinery and systems. The disclosed generators may also be configured for a rotational acceleration or rotating input.

BRIEF DESCRIPTION OF THE DRAWINGS

These and other features, aspects, and advantages of the apparatus and methods of the present invention will become better understood with regard to the following description, appended claims, and accompanying drawings where:

FIG. 2b illustrates a sectional view of the energy harvesting generator of FIG. 2a.

FIG. 5b illustrates a close-up view of the energy harvesting generator of FIG. 5a without a cover thereof.

FIG. 5c illustrates the energy harvesting generator of FIG. 5b shown without the annular mass.

DETAILED DESCRIPTION

Figure 1:
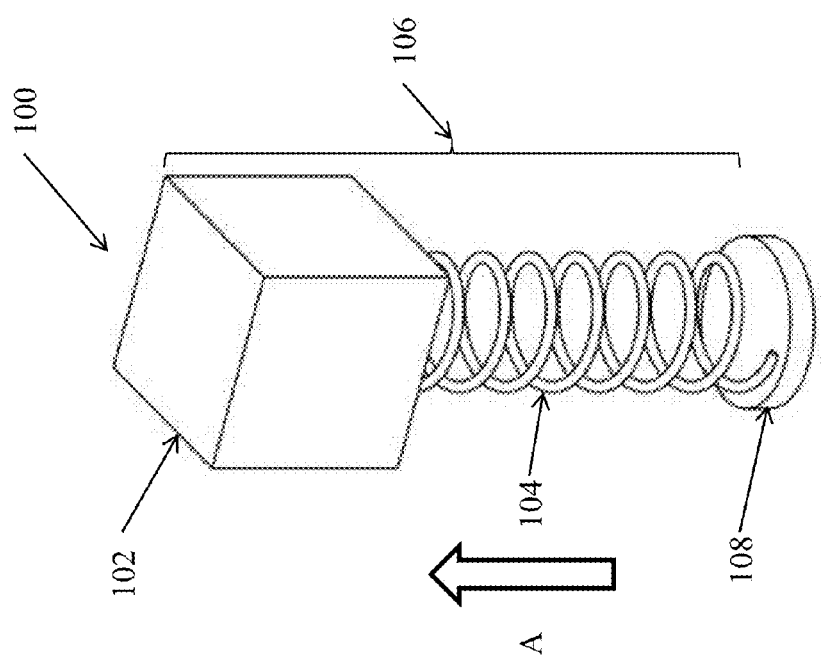
FIG. 1 illustrates a conventional generator which employs a spring-mass system directly connected to a piezoelectric element.

Use of a Motion-Doubling Mechanism to Transmit Forces to the Piezoelectric Element Generators which employ a spring-mass system directly connected to a piezoelectric element have been employed with great success to harvest energy from various acceleration events such as the firing of a projectile from a gun. Such a system 100 is shown schematically in FIG. 1 where the basic principle is that the mass element 102 reacts to an (upward) acceleration event (A), deflecting a generator spring 104 and storing some amount of mechanical potential energy. After the acceleration event subsides, the mass/spring unit 106 (consisting of the spring 104 and mass element 102) is free to vibrate at its natural frequency and it applies a cyclical force to an piezoelectric element 108 where the mechanical strain is converted into electrical potential and may be extracted for storage or immediate use.

The energy harvesting generators described below utilize a novel approach to transmitting the spring force to the piezoelectric element. Such energy harvesting devices exploit a large axial tension induced in a cable or similar flexible element whose ends are fixed and whose midpoint is deflected laterally by a relatively small force.

Figure 2A:
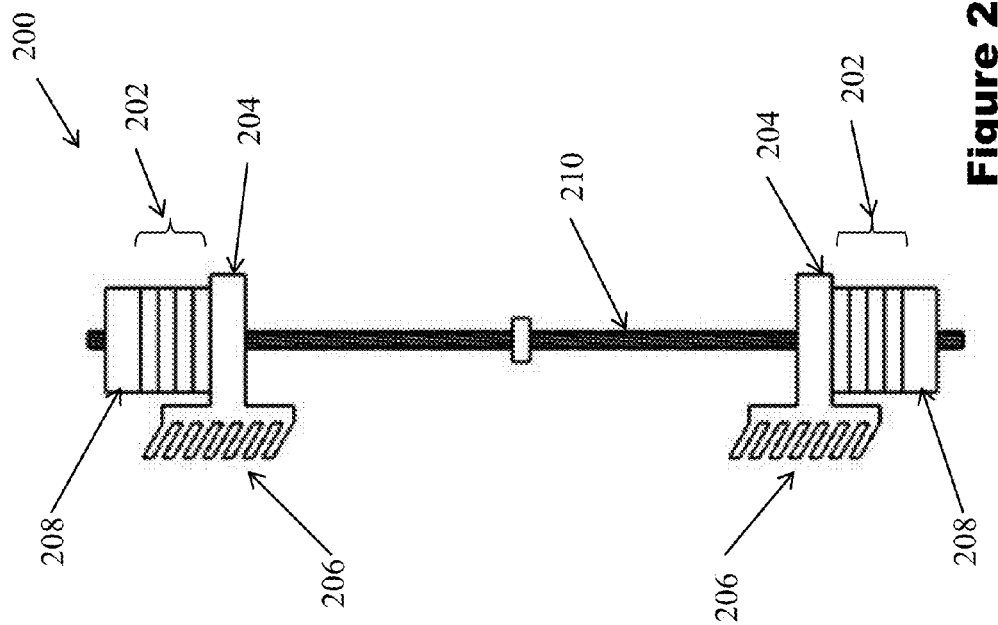
FIG. 2a illustrates first embodiment of an energy harvesting generator.
Figure 2C:
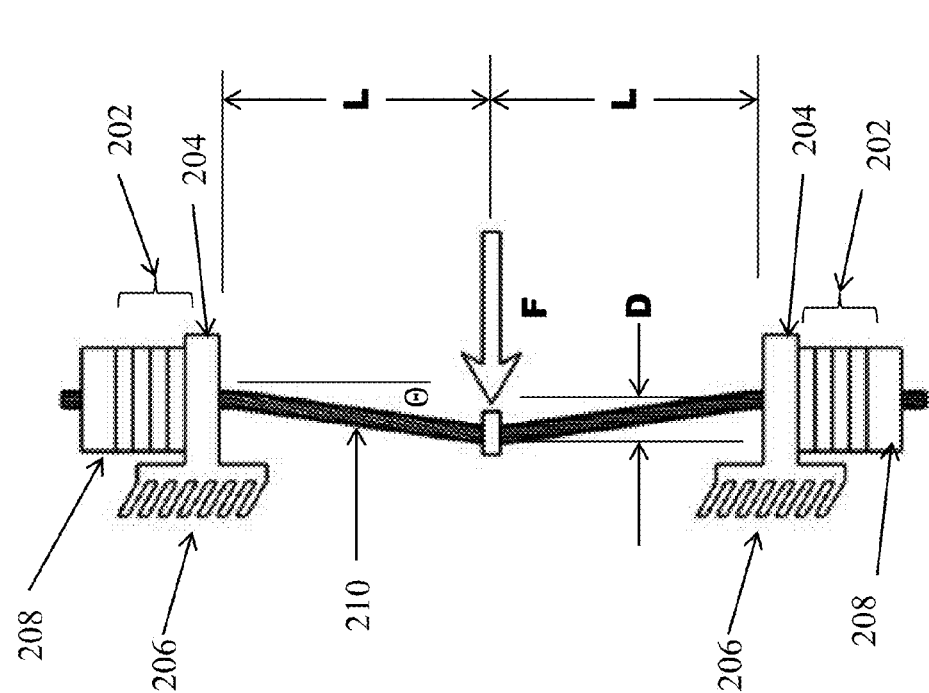
FIG. 2c illustrates the energy harvesting generator of FIG. 2a where a large axial tension is induced in a flexible element.
Figure 2B:
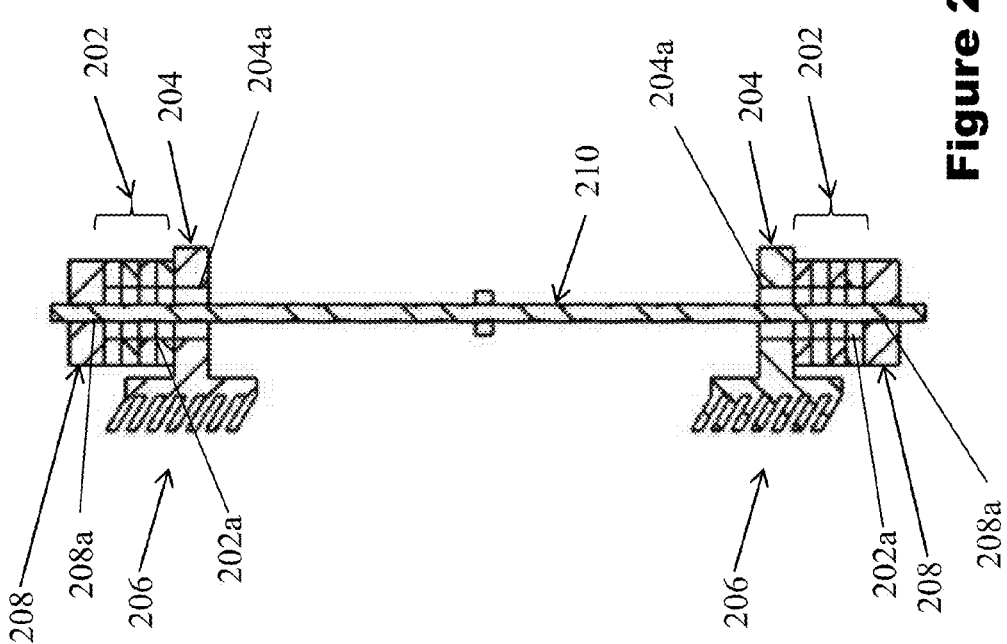

Referring now to FIGS. 2a and 2b, a first embodiment of an energy harvesting generator 200 is illustrated where the transverse force and resultant axial tension applies a compressive load to stacks of piezoelectric elements 202 on either end of the generator 200. The generator 200 includes a pair of such piezoelectric elements 202, each sandwiched between a base member 204 connected to a base structure 206 (such as a base structure of a mortar) and a stop clamp 208. A flexible element 210 (such element is described a "flexible" in that it is flexible in bending but relatively inextensible longitudinally, i.e., along its length), such as a cable or wire rope, is disposed between the pair of piezoelectric elements 202. The flexible element 210 is loosely fitted in a bore 202a in each of the piezoelectric elements 202 and corresponding bore 204a in each of the base members 204, as shown in FIG. 2b. The flexible element 210 is fixed to each of the stop clamps 208 by any means known in the art, such as welding or by being crimped about a bore 208a in the stop clamp 208. The flexible element 210 can be fixed to the stop clamps 208 such that no or very little force is applied to the piezoelectric elements 202 or the flexible element 210 can be fixed to the stop clamps 208 such that the same is in tension so as to preload the piezoelectric elements 202. As can be seen by FIG. 2c, an axial tension is induced along the length of the flexible element 210 whose ends are fixed by the stop clamps 208 by laterally deflecting (D) a midpoint of the flexible element 210 by a force (F). As will be apparent to those skilled in the art, a large axial tension can be induced in the flexible element (and applied to the piezoelectric elements due to the stop clamp 208 compressing the piezoelectric elements 202 against the base member 204) by application of a relatively small force (F).

Figure 3:
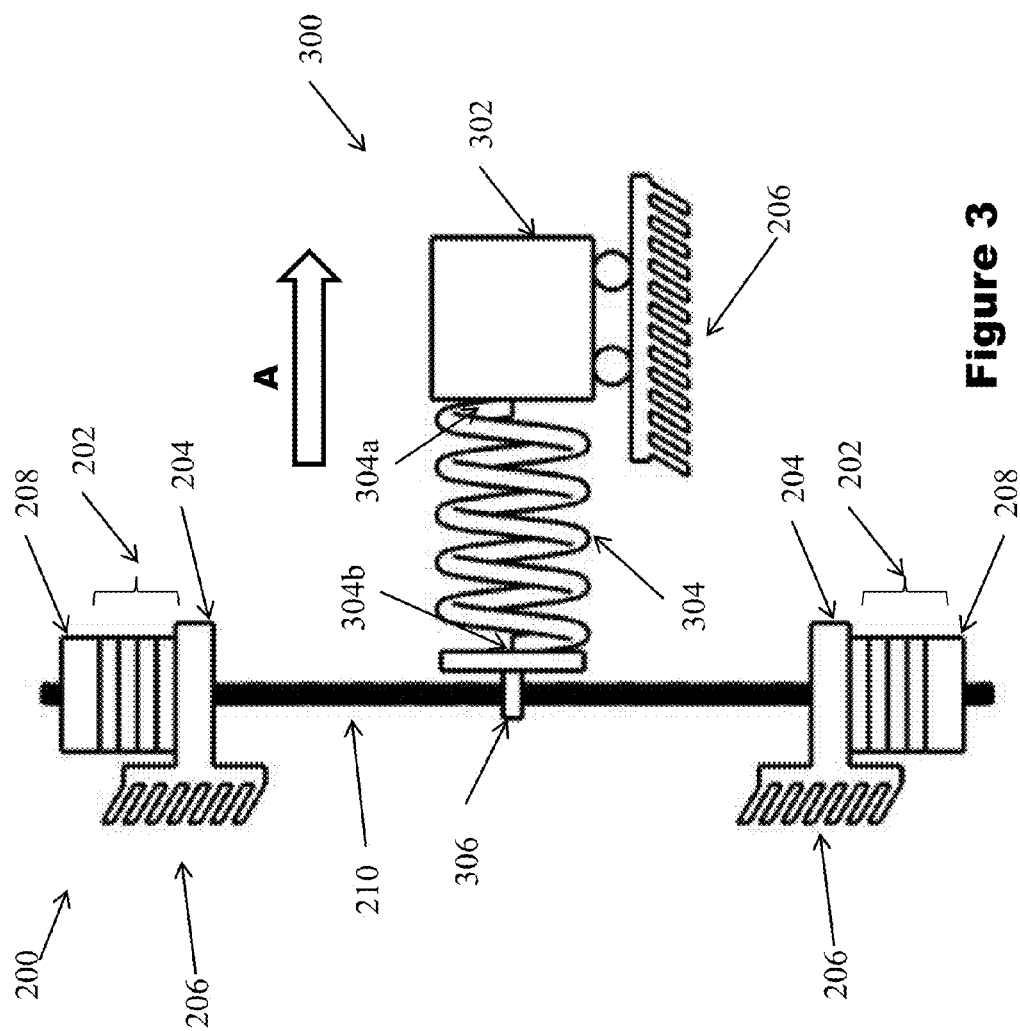
FIG. 3 illustrates the energy harvesting generator of FIG. 2a coupled to a mass/spring system.

Referring now to FIG. 3, there is illustrated the generator 200 of FIG. 2a mated to a mass/spring system 300 to configure a shock/vibration energy harvesting system, which in this case is configured for a lateral acceleration event (A). The mass/spring system 300 includes a mass 302 movable along the direction of the acceleration (A) relative to the base structure 206. The mass 302 is shown schematically in FIG. 3 as being movable on wheels 304 or other rolling elements. However, the mass 302 can be movable by any other means, such as by sliding. The mass 302 is coupled to a compression spring 304 or other spring element at a first end 304a of the spring 304 and to the flexible element 210 at a second end 304b. The second end 304b of the spring 304 can be attached directly to the flexible element 210 or indirectly through a fastening element 306. The fastening element 306 can be attached to the flexible element 210 by any means know in the art, such as by crimping, welding and the like and can be positioned at any point along the axial length of the flexible element 210, such as at a midpoint between the two stop clamps 208.

As described above with regard to FIG. 1, the acceleration event (A) causes the mass 302 to compress the spring 304 to store mechanical potential energy therein. After the acceleration event (A) subsides, the mass/spring unit (consisting of the spring 304 and mass element 302) is free to vibrate at its natural frequency and applies a cyclical force to the flexible element 210, which in turn applies a cyclic compressive force to the piezoelectric elements 202 where the mechanical strain is converted into electrical potential and may be extracted for storage or immediate use.

Such a system 200, 300 has the advantage of a force-multiplying effect as discussed above. The relatively small spring force (F) and resultant lateral deflection (D) of the flexible element 210 is transferred to a much larger axial tension. For example, if the length of the flexible element is 2 L as shown in FIG. 2c, then the deflection angle $\Theta$ is $\tan^{-1}$ (D/L). Then the tensile force T generated in the flexible element (cable) 210 due to the applied force F is T=F/(2 Sin $\Theta$). Therefore, if the cable 210 is relatively inextensible longitudinally and is initially preloaded in tension, then a relatively small force F applied laterally as shown in FIG. 3c, would cause a relatively small deflection D, thereby a small deflection angle $\Theta$, thereby generate a relatively large tensile force T to balance the applied lateral force F. For example, if the deflection angle $\Theta$=10 degrees, then the tensile force T becomes 1/(2 Sin $\Theta$)=1/(2 Sin 10 deg.)=2.9 times larger than the applied lateral force F. Similarly, for a deflection angle of 5 degrees, the induced (axial) tensile force T is about 11.4 times the applied lateral applied force F. A proof-of-concept prototype indicates that deflection angles between 4 and 11 degrees are realistic for practical devices using "aircraft cable" wire rope as the flexible element 210.

Another advantage is a doubling of the frequency of compressive forces applied to the piezoelectric elements 202 as compared to the direct mass-spring-piezoelectric generators known in the art, and discussed above with regard to FIG. 1. In the system 200, 300 illustrated in FIG. 3, each half-cycle of the mass/spring unit 302/304 motion (vibration) produces a full-cycle compression and unloading to the piezoelectric stacks (thus, each full cycle of the mass/spring unit 302/304 motion produces two full-cycles compression and unloading to the piezoelectric stacks). It is appreciated by those skilled in the art that in mass/spring unit based generators such as the one shown in FIG. 1, a substantial and sometimes significantly more than half of the stored mechanical energy in the unit spring is lost due to damping losses in the spring material. The aforementioned doubling motion characteristic of the present invention reduces the number of cycles of mass/spring unit vibration as the mechanical energy is harvested by the piezoelectric element of the said generator. As a result, essentially half as much mechanical energy is lost due to spring material damping, thereby significantly increasing the efficiency of such mass/spring based energy harvesting generators. For example, if around 50% of the mechanical energy is lost due to spring element damping, a value that is probably more on the low side than the high, the efficiency with which such generators would harvest the stored mechanical energy is essentially increased by more than 25%.

These advantages, when combined, increase the efficiency of mass/spring type piezoelectric generators by an order of magnitude or more. The force-multiplying effect increases the energy extracted from the mechanical system quadratically since the electrical potential developed in the piezoelectric element is generally a linear function of applied force and the energy stored in the piezoelectric element (for extraction) is proportional to the square of the voltage. While all piezoelectric generators should be designed to maximize the voltage on the piezoelectric elements, the system 200, 300 illustrated in FIG. 3 allows for much larger piezoelectric elements to be used—ones which in order to reach their maximum voltage would require more force than the acceleration-loaded mass/spring system could provide directly.

The frequency-doubling may seem at first to only extract the energy from the spring-mass system faster and have no net benefit on total harvested energy. However, as previously indicated and as mathematical models of various mass/spring type piezoelectric generators have also indicated, the bulk of the losses in the conversion of the mechanical energy stored in the spring element of mass/spring units as they vibrate are from structural damping in the generator spring, which is a function of the number of cycles of oscillation of the mass/spring system. By doubling the rate at which compressive forces are applied to the piezoelectric elements while holding the natural frequency of the mass/spring system constant, the losses in the system is thereby reduced considerably.

Use of Separate Generation and Transmission Springs in a Discontinuous System

As discussed above, maximization of the voltage on the piezoelectric elements 202 achieves considerable electrical energy output. In the systems discussed thus far, the spring which stores the initial amount of mechanical potential energy is connected to the piezoelectric element through a continuous system. Therefore, as the vibration amplitude of the mass/spring system decays, so does the force applied to the piezoelectric element, no matter the transmission mechanism.

Figure 4:
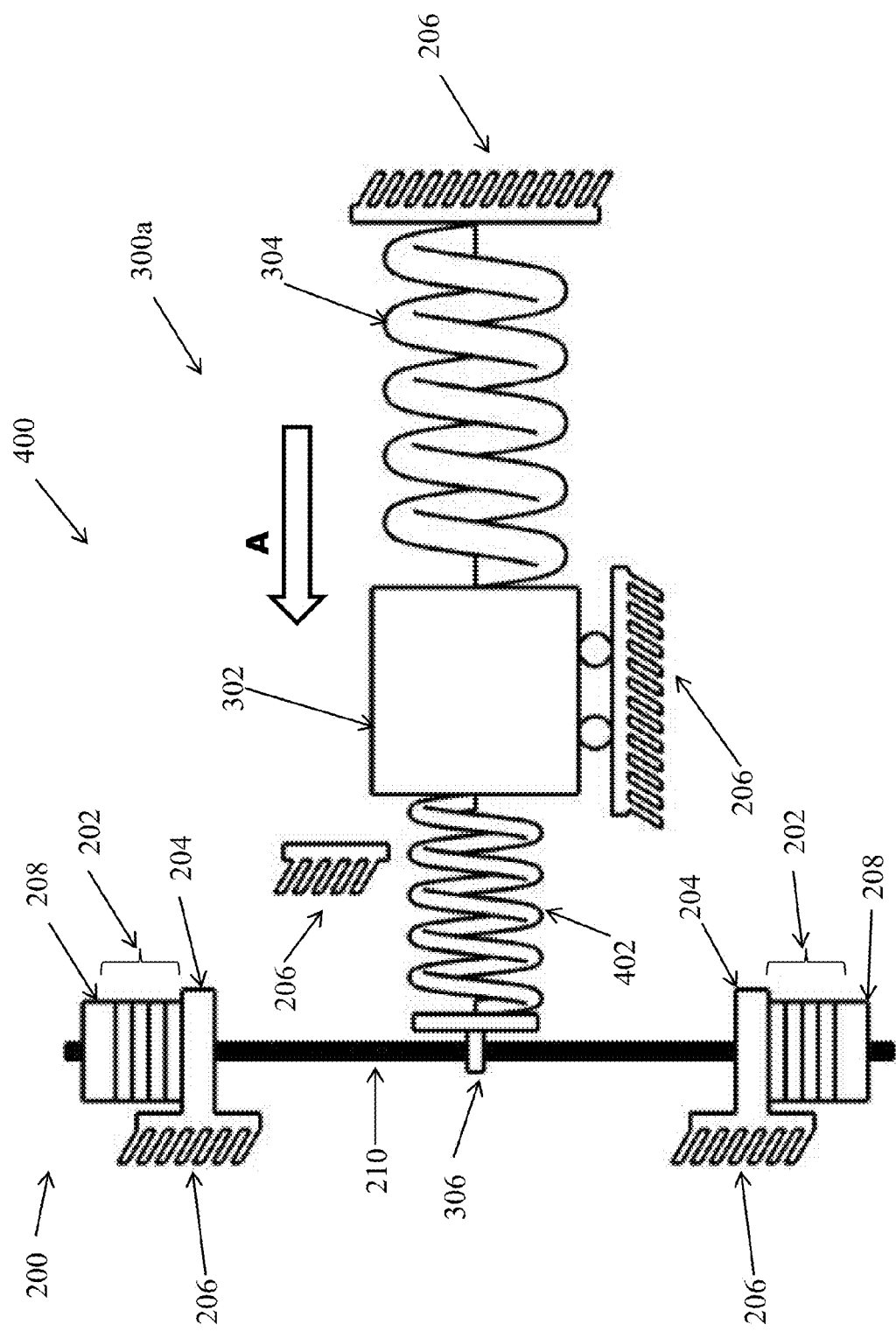
FIG. 4 illustrates a variation of the system of FIG. 3 in which a primary spring stores an initial parcel of mechanical potential energy and a secondary spring transmits the force to the piezoelectric elements.

Referring now to FIG. 4, there is illustrated a system 400, which can provide a constant force amplitude to the piezoelectric elements 202 over many cycles by employing two separate compression springs (or other spring elements): a primary spring 304 to store the initial parcel of mechanical potential energy, and a secondary spring 402 to transmit the force to the piezoelectric elements 202 (in this case through a motion-doubling mechanism).

In the system 400 of FIG. 4, the primary spring 304, having a higher spring constant than a spring constant of the secondary spring, when deflected by the acceleration event (A), exerts a force much greater than the piezoelectric element could withstand without failing. The secondary spring 402 and its accompanying mechanical stop 404 act to transmit the force to the piezoelectric element while limiting the magnitude of the force to the upper limit which the piezoelectric element can withstand due to the mass stop 404 limiting the amount of deflection (D) of the flexible element 210 to produce the maximum voltage. As the vibration amplitude of the primary spring 304 decays, the force transmitted to the piezoelectric elements 202 will remain at the upper limit for many cycles (until the force amplitude of the primary spring 304 drops below the upper limit of the piezoelectric elements 202).

Use of a Motion-Doubling Mechanism in an Energy Harvester for a Mortar Tube

Figure 5A:
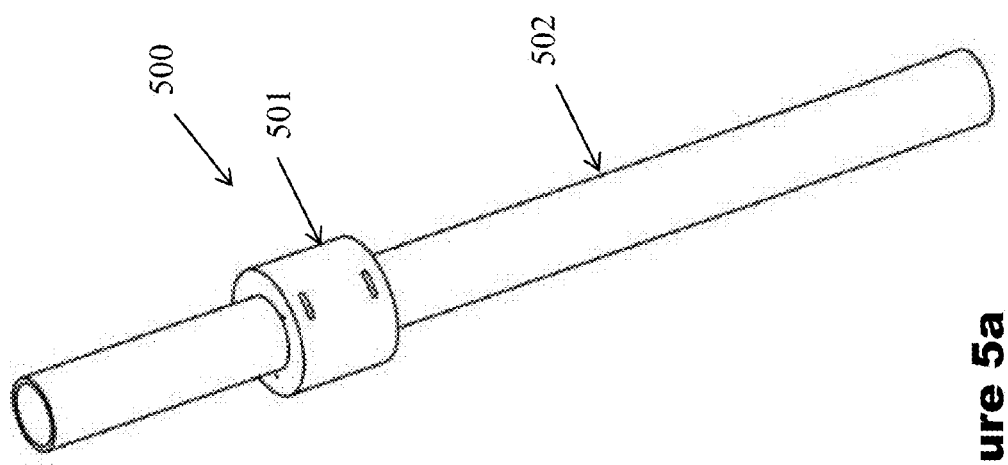
FIG. 5a illustrates an embodiment of an energy harvesting generator configured for a mortar tube.

Referring now to FIGS. 5a-5c, the systems disclosed above may be employed in an electrical energy harvester system 500 for a mortar tube 502. When a mortar is fired, the perturbation of the weapon platform may be used as a mechanical input to a mass/spring piezoelectric generator. As an example, when fired, a 60 mm mortar tube undergoes a chaotic lateral vibration with a magnitude of several thousand G's. The non-directional nature of the vibration and the geometry of the tube are well-suited to a generator design such as the one shown in FIGS. 5a-5c. FIG. 5a shows such system 500 with a covering 501, which is removed for clarity in FIGS. 5b and 5c.

In the system of FIGS. 5a-5c, a single annular mass 504 element is connected to flexible elements 210 (e.g., three force transmission cables) through generator springs 506 (or other spring elements). The single annular mass 504 can be replaced with separate masses corresponding to each of the spring 506. The springs 506, shown in FIG. 5c without the annular mass 504 for clarity, are connected at one end to the flexible element 210 and at another end to the mass 504. The springs 506 can be accommodated in cut-out portions 508 formed in the annular mass. When a lateral acceleration from any direction is experienced, the deflected mass 504 and springs 506 will store an initial amount of mechanical potential energy, as discussed above with regard to FIGS. 2a-2c. After the perturbation subsides, the system 500 will vibrate and pass cyclic transverse forces to the three flexible elements 210, such as at a midpoint thereof. As discussed above, the force multiplication and frequency doubling effects of the cables will allow for highly efficient extraction of energy from the system.

Figure 6:
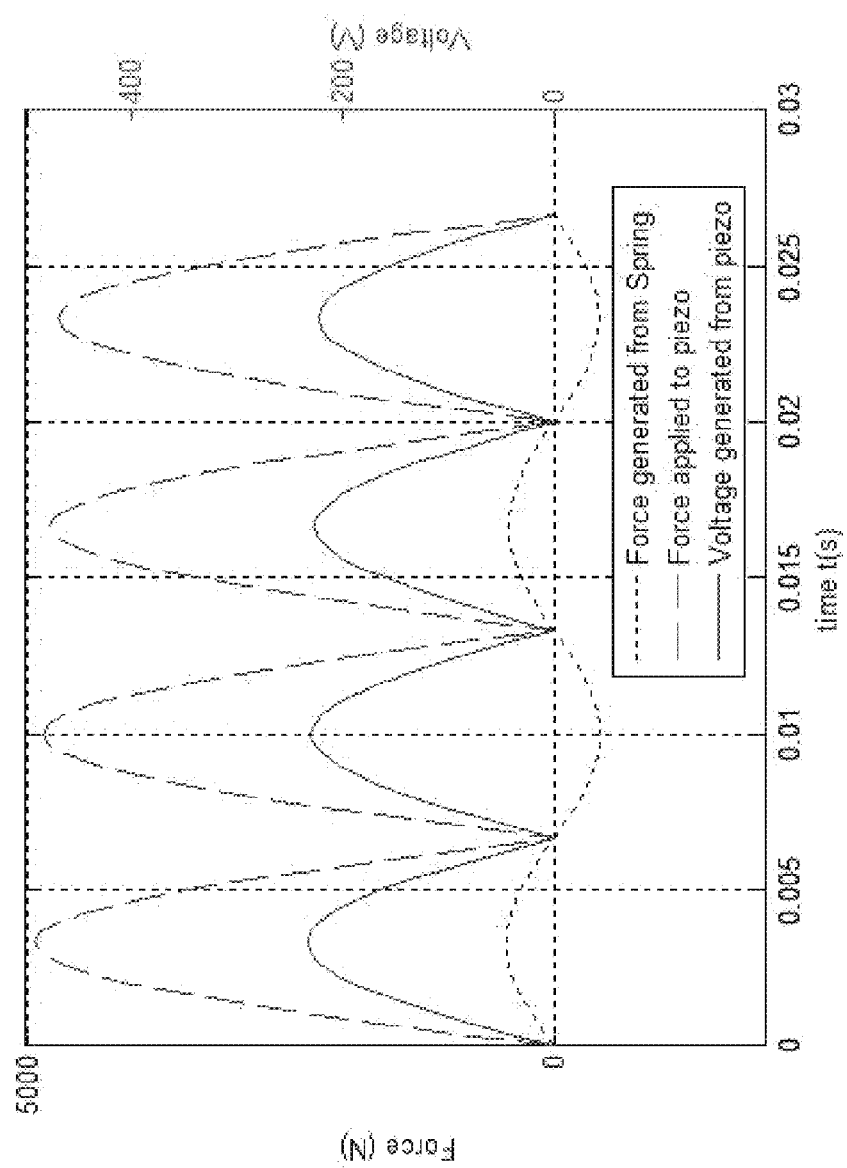
FIG. 6 illustrates a plot of the generator output of FIGS. 5a-5c showing spring force, transmitted piezoelectric force, and rectified open-circuit piezoelectric voltage with energy extraction at voltage extremes.

Mathematical simulations of the system of FIGS. 5a-5c have been performed using first-iteration, un-optimized figures for parameters such as mass, spring rate, and piezoelectric characteristics. Consider a generator which occupies an annulus with an inside diameter of 70 mm, an outside diameter of 120 mm, and a length of 100 mm. The simulation was conducted using parameters of off-the-shelf components which physically fit into the design volume generally as shown in FIG. 5a (by cover 201). For such simulation, a ⅓ equivalent mass paired to one of the three generator modules is considered. For this "⅓-system", a mass of 500 grams is mated to an equivalent generator spring which has a rate of 112 N/mm and a maximum deflection of about 4 mm. In response to the recoil perturbation, such a system would store an initial mechanical potential energy of approximately 900 mJ, and afterward oscillate with a frequency of about 75 Hz. Several cycles of such a generator output are plotted in FIG. 6, which shows the spring force, transmitted piezoelectric force, and the rectified open-circuit piezoelectric voltage with energy extraction at voltage extremes. The energy output for the modeled sub-system was approximately 350 mJ, which indicates an overall efficiency of about 39% based on the 900 mJ initially stored in the generator springs.

The particular geometry of the single annular mass element and the discrete generator modules will not allow for a full 4 mm deflection of all three generator modules; the initial stored energy actually being approximately 1.3 J for the system as a whole. Also, the chaotic nature of the recoil perturbation will further muddy the waters in trying to estimate the energy output of the device, but as a rough-order-of-magnitude, designs such as this can clearly provide electrical energy in the hundreds of millijoules. Considering this, and some initial testing of a proof-of-concept prototype, efficiencies of at least between 20% and 40% are achievable.

Although not shown, a discontinuous dual-stage generator such as the concept illustrated in FIG. 4 may be employed in the system of FIGS. 5a-5c to further increase efficiency.

Thus, the energy harvesting power source generators disclosed herein provide a novel motion-doubling mechanism forming a two-stage force transmission system. Such features represent major advances in the potential performance and efficiency of piezoelectric type energy harvesters, thereby also expanding the potential field of application of such technology.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An energy harvesting generator comprising:
    at least one piezoelectric element disposed between a base element connected to a base structure and a stop;
    a flexible element fixed at at least one end to the stop;
    wherein a deflection of the flexible element results in a compression of the piezoelectric element between the stop and the base element.

2. The energy harvesting generator of claim 1, wherein:
    the at least one piezoelectric element comprises a pair of piezoelectric elements, each disposed between a respective base element and stop; and
    the flexible element is fixed at each of two ends to a respective stop.

3. The energy harvesting generator of claim 1, wherein the at least one piezoelectric element comprises at least one stack of piezoelectric elements.

4. The energy harvesting generator of claim 1, wherein the flexible element is fixed to the stop at one end such that the flexible element is preloaded in tension.

5. The energy harvesting generator of claim 1, wherein the flexible element is a cable.

6. The energy harvesting generator of claim 1, further comprising a deflection generation device for applying the deflection to the flexible element.

7. The energy harvesting generator of claim 1, wherein the deflection generation device is a mass/spring unit for generating the deflection upon an acceleration event.

8. The energy harvesting generator of claim 7, wherein the mass/spring unit comprises:
    a mass movable in response to the acceleration event; and
    at least one spring element connected at one end to the mass and at another end to the flexible element;
    wherein the acceleration event results in a movement of the mass to deflect the spring element and store mechanical potential energy in the spring element, the spring element vibrating after the acceleration event subsides to result in the deflection of the flexible element.

9. The energy harvesting generator of claim 8, wherein the mass is configured to move in translation.

10. The energy harvesting generator of claim 8, wherein the at least one spring element comprises at least one compression spring.

11. The energy harvesting generator of claim 1, wherein the base structure is a mortar tube.

12. The energy harvesting generator of claim 11, wherein the at least one piezoelectric element, base element, stop and flexible element configure a sub-generator and more than one sub-generator is provided on the mortar tube.

13. The energy harvesting generator of claim 12, wherein the more than one sub-generators are spaced around an outer circumferential surface of the mortar tube.

14. The energy harvesting generator of claim 7, wherein the mass/spring unit comprises:
    a mass movable in response to the acceleration event;
    a mass stop for limiting a range of motion of the mass to deflect the flexible element;
    at least one primary spring element connected at one end to the mass and at another end to the base structure for generating the deflection upon an acceleration event; and
    at least one secondary spring element connected at one end to the mass and at another end to the flexible element, a spring constant of the primary spring element being larger than a spring constant of the secondary spring element;
    wherein the acceleration event results in a movement of the mass to deflect the primary spring element and store mechanical potential energy in the primary spring element, the primary spring element vibrating after the acceleration event subsides to vibrate the secondary spring element within the range of motion to result in the deflection of the flexible element.

15. The energy harvesting generator of claim 14, wherein the at least one primary spring element and at least one secondary spring element comprises at least one primary compression spring and at least one secondary compression spring, respectively.

16. A method for harvesting energy from an input deflection, the method comprising:
    storing mechanical potential energy in at least one spring element resulting from an acceleration of a mass connected to the at least one spring element;
    transferring the stored potential energy to a flexible element to deflect the flexible element; and
    converting the deflection of the flexible element to electrical energy by compressing at least one piezoelectric element due to the deflection.

17. The method of claim 16, further comprising repeating the transferring and converting where the mass vibrates after the acceleration subsides.

18. The method of claim 16, wherein the transferring comprises attaching the mass to one end of the spring element and attaching another end of the spring element to the flexible element.

19. The method of claim 16, wherein the spring element comprises a primary spring element and further comprising a secondary spring element, a spring constant of the primary spring element being larger than a spring constant of the secondary spring element, wherein the transferring comprises:
    attaching one end of the mass to one end of the primary spring element and attaching another end of the primary spring element to a base structure;
    attaching another end of the mass to one end of the secondary spring element and attaching another end of the secondary spring element to the flexible element; and
    limiting a range of motion of the mass to deflect the flexible element.

20. The method of claim 16, wherein the base structure is a mortar tube and the mass is an annular mass, the transferring comprises attaching the annular mass to one end of the spring element and attaching another end of the spring element to the flexible element.

* * * * *